Patented Feb. 6, 1940

2,189,725

UNITED STATES PATENT OFFICE 2,189,725

AGE RESISTER

Albert M. Clifford, Stow, Ohio, assignor to Wingfoot Corporation, Wilmington, Del., a corporation of Delaware No Drawing. Application January 30, 1937, Serial No. 123,276

12 Claims. (Cl. 260—809)

This invention relates to the treatment of rubber and the like for the purpose of retarding deterioration thereof and, more particularly, it relates to age resisters or antioxidants intended to be incorporated in or applied to rubber and similar materials to increase the useful life of such materials.

This case is a continuation in part of application Serial No. 17,140 filed April 18, 1935 which matured into U. S. Patent 2,084,131.

The new age resisters are obtained by appropriate chemical treatment of certain coal tar fractions to form amino or phenolic compounds therefrom and then further reacting with an amine or a phenol, respectively, to form secondary amines, although the primary amines obtained by treatment of the coal tar fraction may also be used as antioxidants without further treatment other than purification. The age resister or antioxidant is a complex mixture of compounds. Among the objects of the invention is to provide a method of treating rubber with these complex mixtures to retard deterioration, loss of tensile strength and elasticity as a result of the effect of air, heat, light or other influences. Another object of the invention is to provide an improved antioxidant or age resister which can be readily incorporated into rubber and which will not bloom on the surface of the article after incorporation and to provide a rubber compound treated with the same. Other objects will in part be obvious and will in part appear hereinafter.

Certain individual compounds have been isolated from coal tar fractions and treated to form amino compounds which have been tested in rubber for their antioxidant effect, among these being the amino acenaphthenes, the amino phenanthrenes, and the amino fluorenes, as set forth in United States Patents Nos. 1,809,799, 1,894,231 and 1,906,314. It has now been found that certain fractions of coal tar may be treated by chemical reagents and all of the secondary amino bodies thus formed used, without separation of the individual compounds, as an antioxidant in rubber. The mixture has the advantage over the individual compounds that its melting point is lower than that of most of its constituents so that it may be readily dispersed through the rubber during the mixing and, the tendency to crystallize being inhibited by the complexity of the mass, there is little or no tendency for the antioxidant to bloom on the surface of the rubber article after manufacture. Also, the age resister is cheaper to make and more economical to use since no purification steps are performed and all of the reaction mass is utilized. A coal tar fraction boiling between the approximate limits of 170° C. and about 350° C. can be used for the purposes of the present invention. However, it is preferred to use a fraction boiling between 170° and 250° C., since such a fraction gives a higher percentage of active material in the resulting antioxidant.

A coil tar oil fraction taken between these limits contains a number of compounds of moderately high molecular weight, mostly hydrocarbons, such as methyl naphthalene, acenaphthene, fluorene, phenanthrene, cumene, indene, pyrene, diphenyl oxide, traces of carbazol, etc. One of the fractions utilized herein is termed the methyl naphthalene fraction due to the large proportion of this constituent which it contains. Among the coal tar fractions which have been found to be amenable to treatment in accordance with the present invention to obtain valuable age resisters, may be mentioned the following: A fraction, denominated Fraction A for purposes of identification, was prepared from crude coke oven coal tar, specific gravity 1.10–1.25, with a maximum free carbon content of 15% and a maximum ash of 0.50%. The coal tar was subjected to distillation, first under atmospheric pressure up to a temperature of 230–250° C. and then under reduced pressure until no more distillate could be obtained. The final distillate came over at about 350° C. at 10 mm. pressure and the total distillate comprised a fluorescent oil, darkening on exposure to light. There was observed during the distillation operation a crystalline material appearing in the distillate at about 100° C. and again at 180° C. but this dissolved in the main distillate on warming. The density of the distillate was 1.078 g./cc. at 20° C. and the alkali-insoluble portion amounted to 90% of the whole distillate. The remaining alkali-soluble portion consists of phenols, cresols, etc. Another coal tar oil, termed Fraction B, is a practically neutral special oil containing no phenolic bodies and having a boiling point between 225° C. and 300° C.

Another neutral oil, called Fraction C, had a boiling point between 180° C. and 245° C.

The coal tar fraction may be treated in various ways, in accordance with the invention, to yield antioxidants. Thus, amino bodies may be derived therefrom by nitration and reduction, or, phenolic bodies may be obtained by sulfonation and subsequent fusion with caustic soda as, for example, by the processes described in Lassar-Cohn's Arbeitsmethoden, 5th Edition, page 919, and Richter, volume 2 of the D'Albe translation from the 11th German edition, page 183. Of course, any feasible method of introducing amino or hydroxy groups may be followed. The amines or phenols respectively, are then separated from the unreacted residue of the coal tar and either used as such, in the case of the amines, as an antioxidant in rubber, or are further reacted with an appropriate phenol, or alcohol or amine, or a plurality of such, to yield a mixture of secondary amino compounds which is the preferred antioxidant.

The procedure by which phenolic bodies are first produced and then reacted with amines to form a mixture of secondary amines is illustrated by the following example. Mixed phenolic compounds resulting from sulphonation followed by caustic fusion of Fraction B were reacted with aniline in the ratio of 52 grams of the phenolic compounds to 60 grams of aniline. The reaction was carried out in the presence of 1 cc. of hydriodic acid, HI, (50%) under a reflux condenser for 13 hours, the temperature being 180°–200° C. During the course of the reaction, 4 cc. of water were collected. The product was distilled to eliminate excess aniline and the residue was washed with dilute HCl, water, dilute NaOH and finally water, in the order given. The yield was 63 grams of a dark viscous tar which was tested in rubber.

Other materials of the invention may be similarly prepared by substituting for the aniline of the foregoing example various other primary amines. These amines may be either aliphatic or aromatic but the latter form the preferred group. Representative amines are o-, m-, and p-toluidine, the xylidines, alpha naphthylamine, beta naphthylamine, diamino benzenes such as o-, m-, and p-phenylene diamine, o-, m-, and p-aminophenol, o-, m-, and p-phenetidine, p-p' diamino diphenylmethane, the butylamines, the amylamines, allylamine, alpha furfurylamine, benzylamine, beta phenethylamine, alpha tetrahydrofurfurylamine, cyclohexylamine, etc. Also mixtures of amines such as mixed toluidines, mixed xylidines, mixed amylamines, etc. may be employed.

It will be observed that various tar fractions, boiling between about 170° C. and 350° C., may be successfully treated in the manner herein described or the entire fraction boiling between these limits may be so treated. However, it is preferred to act upon a coal tar fraction taken between about 170° C. and 250° C. since a greater concentration of valuable constituents is found in the narrower range.

The mixtures, which may be characterized as complexes of secondary amino compounds, although containing other amino compounds as well, constitute excellent antioxidants in rubber, are readily dispersed therein despite the rather large molecular weight of some of the constituents, and evidence little or no tendency to bloom.

Various constituent compounds of the mass may also be used individually as antioxidants in rubber, some of these being methyl amino methyl naphthalene, phenyl acenaphthyl amine, tolyl phenanthryl amine, xylyl acenaphthene amine, phenyl fluorenyl amine, cumidyl methyl naphthylamine, etc.

The antioxidants prepared according to the preceding examples have been tested in a rubber compound made up in accordance with the following formula:

|  | Parts by weight |
|---|---|
| Extracted pale crepe | 100.0 |
| Zinc oxide | 5.0 |
| Sulfur | 3.0 |
| Hexamethylene tetramine | 1.0 |
| Stearic acid | 1.5 |
| Antioxidant | 1.0 |

The test pieces were aged for six days in an oxygen bomb at a temperature of 50° C. at a pressure of 150 pounds and the following results obtained:

| Cure | Original | | | | Aged | | | | Percent weight inc. | T. R. |
|---|---|---|---|---|---|---|---|---|---|---|
|  | Tens. | Elg. | 500 percent | 700 percent | Tens. | Elg. | 500 percent | 700 percent | | |
| Phenyl amino derivative (phenols from oil B+aniline) | | | | | | | | | | |
|  | | | | | | | | | | Percent |
| 35/285 | 74 | 825 | 13 | 36 | 114 | 825 | 18 | 55 | 0.02 | |
| 50 | 100 | 830 | 16 | 52 | 126 | 800 | 20 | 72 | .04 | 120 |
| 70 | 127 | 765 | 24 | 87 | 136 | 735 | 30 | 112 | .08 | |

In the above table, the column headed T. R. gives the tensile ratio of the sample under test, i. e., a ratio of the tensile strength after aging to the tensile strength before aging. This affords an accurate estimate of the value of the antioxidant.

The treatment of rubber, as herein defined, includes the incorporation of the age resisters into the rubber by milling or other working, the application thereto to the surface of a mass of unvulcanized or vulcanized rubber, or the addition of the material to rubber latex to coagulation. The term "rubber" is employed in a generic sense to include rubber itself, reclaimed rubber, gutta percha, balata, synthetic rubber, and the like, whether or not admixed with fillers, pigments, vulcanizing agents and other compounding ingredients.

Although there have been described above several examples indicative of the methods which may be followed to obtain the antioxidants to which the present invention relates, it will be understood that the invention is not limited thereto but is capable of various modifications within the scope of the appended claims by which it is intended to claim all features of patentable novelty inherent in the invention.

I claim:

1. The process of improving the age-resisting properties of rubber which comprises incorporating therein the composite reaction product obtainable by reacting a primary amine with mixed phenolic bodies prepared from a coal tar oil fraction boiling between the approximate limits of 170° C. and 350° C.

2. The process of improving the age-resisting properties of rubber which comprises incorporating therein the composite reaction product obtainable by reacting a primary amine with mixed phenolic bodies prepared from a coal tar oil fraction boiling between the approximate limits of 170° C. and 250° C.

3. The process of improving the age-resisting properties of rubber which comprises incorporating therein the composite reaction product obtainable by reacting aniline with mixed phenolic bodies prepared from a coal tar oil fraction boiling between the approximate limits of 170° C. and 350° C.

4. A vulcanized rubber product possessing improved age-resisting properties comprising rubber and the composite reaction product obtainable by reacting a primary amine with mixed phenolic bodies prepared from a coal tar oil fraction boiling between the approximate limits of 170° C. and 350° C.

5. A vulcanized rubber product possessing improved age-resisting properties comprising rubber and the composite reaction product obtainable by reacting a primary amine with mixed phenolic bodies prepared from a coal tar oil fraction boiling between the approximate limits of 170° C. and 250° C.

6. A vulcanized rubber product possessing improved age-resisting properties comprising rubber and the composite reaction product obtainable by reacting aniline with mixed phenolic bodies prepared from a coal tar oil fraction boiling between the approximate limits of 170° C. and 350° C.

7. The process of improving the age-resisting properties of rubber which comprises incorporating therein the composite reaction product obtainable by reacting a primary amine with mixed phenolic bodies prepared by sulfonating a coal tar oil fraction boiling between the approximate limits of 170° and 350° C. and fusing the sulfonated mass with caustic alkali.

8. The process of improving the age-resisting properties of rubber which comprises incorporating therein the composite reaction product obtainable by reacting a primary amine with mixed phenolic bodies prepared by sulfonating a coal tar oil fraction boiling between the approximate limits of 170° C. and 250° C. and fusing the sulfonated mass with caustic alkali.

9. The process of improving the age-resisting properties of rubber which comprises incorporating therein the composite reaction product obtainable by reacting aniline with mixed phenolic bodies prepared by sulfonating a coal tar oil fraction boiling between the approximate limits of 170° C. and 350° C. and fusing the sulfonated mass with caustic alkali.

10. A vulcanized rubber product possessing improved age-resisting properties comprising rubber and the composite reaction product obtainable by reacting a primary amine with mixed phenolic bodies prepared by sulfonating a coal tar oil fraction boiling between the approximate limits of 170° C. and 350° C. and fusing the sulfonated mass with caustic alkali.

11. A vulcanized rubber product possessing improved age-resisting properties comprising rubber and the composite reaction product obtainable by reacting a primary amine with mixed phenolic bodies prepared by sulfonating a coal tar oil fraction boiling between the approximate limits of 170° C. and 250° C. and fusing the sulfonated mass with caustic alkali.

12. A vulcanized rubber product possessing improved age-resisting properties comprising rubber and the composite reaction product obtainable by reacting aniline with mixed phenolic bodies prepared by sulfonating a coal tar oil fraction boiling between the approximate limits of 170° C. and 350° C. and fusing the sulfonated mass with caustic alkali.

ALBERT M. CLIFFORD.